Figure 1:
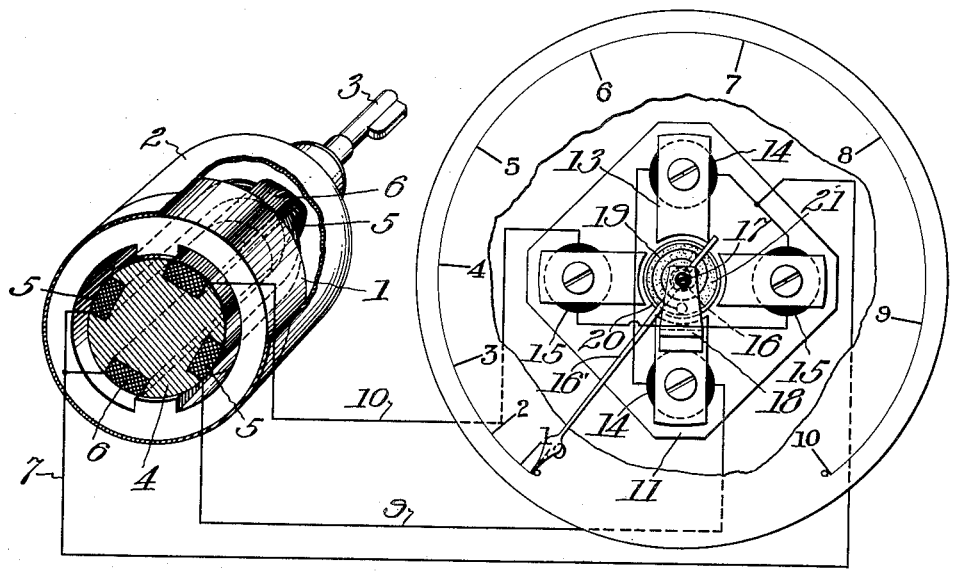

May 2, 1933.       G. CARPENTER       1,907,343
ELECTRICAL TACHOMETER
Filed March 24, 1931

Inventor:
Grant Carpenter,
By Byrnes Townsend & Potter,
Attorneys.

Patented May 2, 1933

1,907,343

UNITED STATES PATENT OFFICE

GRANT CARPENTER, OF NEWARK, NEW JERSEY, ASSIGNOR TO WESTON ELECTRICAL INSTRUMENT CORPORATION, OF NEWARK, NEW JERSEY, A CORPORATION OF NEW JERSEY

ELECTRICAL TACHOMETER

Application filed March 24, 1931. Serial No. 524,975.

This invention relates to electrical measuring instruments, and more particularly to alternating current instruments adapted for use with alternating current magnetos as tachometers or speed indicators.

Electrical tachometers consisting of some form of magneto generator coupled with some form of electrical measuring instrument, for example, a voltmeter calibrated in appropriate units such as revolutions per minute or miles per hour, have been known for years and have been the subject of numerous patents and technical articles. Due to the decided advantages of direct current instruments, particularly as to the length of the scale and the uniformity of scale graduations, the commercial forms of tachometers have operated substantially exclusively from direct current magnetos, although it has long been recognized that the problem of preventing variation in the contact between the brushes and commutator has limited the field of use of tachometers of this type.

Tachometers which have attempted to avoid the shortcomings of the direct current magneto by the use of alternating current magnetos with fixed windings have not been commercially successful due to the inherent limitations of the measuring instruments which are available for use with alternating current. The usual types of alternating current voltmeters are open to two very serious objections;—lack of sensitivity and/or short angular scale lengths.

Vibrating reed instruments of the Fromm type are fairly reliable, but are limited in their application and range, being useful only in locations which are free from mechanical vibrations within the range of speeds to be indicated.

Still other attempts to solve the problem are based upon the use of auxiliary equipment, including rectifiers, between a direct current measuring device and an alternating current magneto. Aside from any question of additional expense, the added equipment increases the possibility of erroneous readings, and, in the case of rectifiers, both time and temperature variations are to be expected.

An object of the invention is to provide an alternating current measuring device which, while useful for other purposes, is particularly useful as an element of an alternating current tachometer. An object of the invention is to provide a sensitive alternating current measuring instrument in which the scale length may be of the order of upward of 270°. Further objects are to provide a measuring instrument operable on alternating current and substantially free from frequency variations and/or temperature variations. A further object is to provide an alternating current measuring instrument in which the torque is developed in the moving system by magnetic hysteresis. More specifically, an object is to provide an alternating current measuring instrument which includes a magnetic system for establishing a rotating magnetic field, and a moving system that is characterized by a body of magnetic material positioned in the magnetic field.

Figure 2:
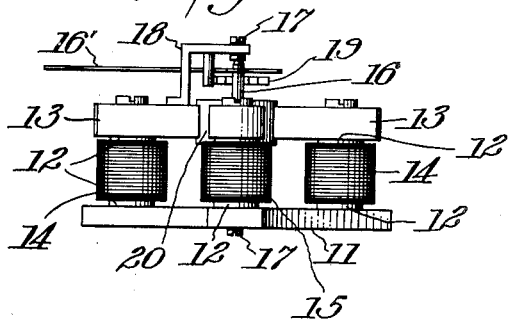
Figure 3:
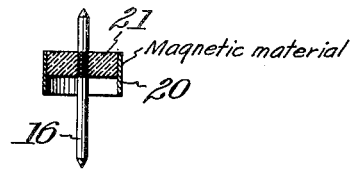

These and other objects of the invention will be apparent from the following specification, when taken with the accompanying drawing, in which Fig. 1 is a somewhat diagrammatic view of an electric tachometer which includes a multiphase magneto and an instrument embodying the invention, Fig. 2 is a side elevation of the measuring instrument, and Fig. 3 is a fragmentary side elevation, with parts in section, of the moving system of the instrument.

Referring first to the illustrated multiphase generator which is one appropriate form of magneto suitable for use with the measuring instrument, the reference numeral 1 identifies the circular permanent magnet which is mounted in a supporting sleeve 2 that terminates in a non-circular coupling shaft 3. The sleeve and shaft are mounted in suitable bearings, not shown, for rotation about the stationary armature 4 carrying connected windings 5 and 6 which develop a two phase alternating current when the magnet 1 is rotated by the machine element to which the shaft 3 is connected. A lead 7 extends from the common terminal of windings 5, 6 and individual leads 9, 10 extend from the opposite terminals of the respective armature windings.

From the viewpoint of electrical operation, the indicating apparatus includes an electromagnetic system for developing a rotating magnetic field, and a body of magnetic material such, for example, as a relatively low carbon steel, having a fairly large hysteresis characteristic pivotally supported in the rotating field.

As shown in Figs. 1 and 2, the electromagnetic system comprises a soft iron base 11 from which rise four posts 12 that terminate in pole pieces 13, the adjacent ends of the pole pieces being arcuate and defining a cylindrical gap. Windings 14 on one pair of opposed posts are serially connected between leads 7 and 9, and similar windings 15 are serially connected between the leads 7 and 10. The alternating current generated in windings 5, 6 will therefore establish a rotating magnetic field in the cylindrical gap between the pole pieces 13.

The moving system of the indicator is carried by a shaft 16 which is mounted for angular movement about the axis of the cylindrical gap, the lower and upper bearings 17, 17 of the shaft being carried by the base 11 and by a bridge member 18 that is fixed to one of the pole pieces. The shaft carries a pointer 16' for movement over a scale which, as indicated diagrammatically in Fig. 1, may be of the order of 360°. One or more torsion springs 19 of the usual type are provided for providing an opposing torque to the shaft 16 and associated elements of the moving system.

As indicated above, the element of the moving system which is acted upon by the rotating field is formed of material which has a relatively high hysteresis characteristic. As best shown in Fig. 3, this element may take the form of a cylinder 20 which is supported on the shaft 16 by a washer 21 of non-magnetic material, such as molded phenolic resin. It is to be noted, however, that this particular shape is not essential, as the magnetic material may have any other convenient form such as a cup, disk or sphere.

The operation of the tachometer system is as follows. When the magnet 1 is rotated by coupling the shaft 3 to a rotating element of a machine, engine or the like, the current flow through the windings 14, 15 sets up a rotating magnetic field in the cylinder 20. Since the armature windings are stationary, there are no disturbances from commutation and the current flow through the indicator windings is substantially a function of the speed of the magnet only.

The flux passes across the air gap through a portion of the cylinder 20 and a torque is set up which, by appropriate choice of the strength of the spring 19 in any given case, will result in a substantially uniform spacing of the scale graduations over the greater part of the scale.

The following is suggested as an explanation of the principles of operation of this type of measuring instrument, but it is to be understood that the invention is not dependent upon any particular theory of operation and that further investigation may develop other factors which are responsible, in whole or in part, for the operation of the instrument. It is believed that, when the rotating magnetic field is established, the torque is developed by a magnetic drag or hysteresis action set up in the cylinder 20, and which tends to cause the cylinder to rotate. Rotation of the cylinder is opposed, however, by a spring selected in proper proportion to the force developed in the cylinder.

It is obvious that the angular velocity of the rotating field is dependent upon the speed of the magneto and that the density of the magnetic field increases with the voltage generated by the magneto. I have found that the torque produced in the cylinder is practically, if not entirely, free from variation with changes in frequency for a given field strength. Furthermore, since the hysteresis characteristic of the magnetic body is substantially constant throughout the range of temperatures at which the instrument will be operated, the instrument is substantially free from variations arising from temperature changes.

In these respects, the present invention is distinguished from the Foucault current type of induction meter in which a non-magnetic member is pivoted in a rotating field. Such instruments respond not only to frequency changes, but their operation is directly affected by the temperature coefficient of the non-magnetic material.

It will be apparent that there is an exceedingly wide latitude in the design of the indicating instrument, and particularly in the scale characteristics which may be obtained. The choice of the magnetic material, the shape and size of the body of material, and the strength of the torsion spring will all influence the position of the scale graduations when associated with a particular magnetic system for establishing a rotating field. The general design principles applicable to other types of electrical indicating instruments will enable those familiar with this art to effect such relation between the various elements as to obtain satisfactory scale characteristics.

I claim:

1. An alternating current measuring instrument comprising pole pieces and electromagnetic means for establishing a rotating magnetic field, means pivotally supported in and acted upon by said field to develop a torque which is substantially proportional to the strength of the rotating field, and means opposing movement of said pivotally supported means under the influence of the torque developed by said rotating field, said pivotally supported means including an element movable with respect to a fixed device to provide a measurement of the torque.

2. An alternating current measuring instrument comprising pole pieces and electromagnetic means for establishing a rotating magnetic field, a moving system including a magnetic body pivotally supported in and acted upon by said field to develop a torque which varies with the field strength, spring means opposing movement of said moving system, and an arm forming a part of said moving system and movable over a fixed scale.

3. In an indicating instrument adapted to be employed with an alternating current magneto to constitute an electrical tachometer, the combination with a yoke of magnetic material having pole pieces spaced apart to define a cylindrical air gap, windings on said yoke for establishing a rotating magnetic field in said gap when energized by alternating current, and an indicating system; said indicating system comprising a shaft, bearings rotatably supporting said shaft at the axis of said gap, a pointer secured to said shaft and movable over a fixed scale, means secured to said shaft and acted upon by said rotating field to develop a torque dependent upon the field strength and substantially independent of the angular velocity of the rotating field, and resilient means for opposing said torque.

4. The invention as set forth in claim 3, wherein said means comprises a cylinder formed of material having a substantial magnetic hysteresis characteristic.

5. An indicating instrument for use with an alternating current magneto to constitute an electrical tachometer, said instrument comprising the combination with a yoke of magnetic material having a series of pole pieces spaced apart to define a cylindrical air gap, and windings on said yoke for establishing a rotating magnetic field in said gap when energized by alternating current, of an indicating system comprising a magnetic body in said gap and constituting the only magnetic material in the flux path between adjacent pole pieces, means rotatably supporting said magnetic body, and means yieldingly opposing rotation of said magnetic body.

6. The invention as set forth in claim 5 wherein said magnetic body consists of material having a substantial magnetic hysteresis characteristic.

In testimony whereof, I affix my signature.

GRANT CARPENTER.